April 18, 1939.  F. DURSCH  2,155,182
GANG LAWN MOWER
Filed Jan. 27, 1937  4 Sheets-Sheet 1

INVENTOR
Frank Dursch
BY
Synnestvedt + Lechner
ATTORNEYS

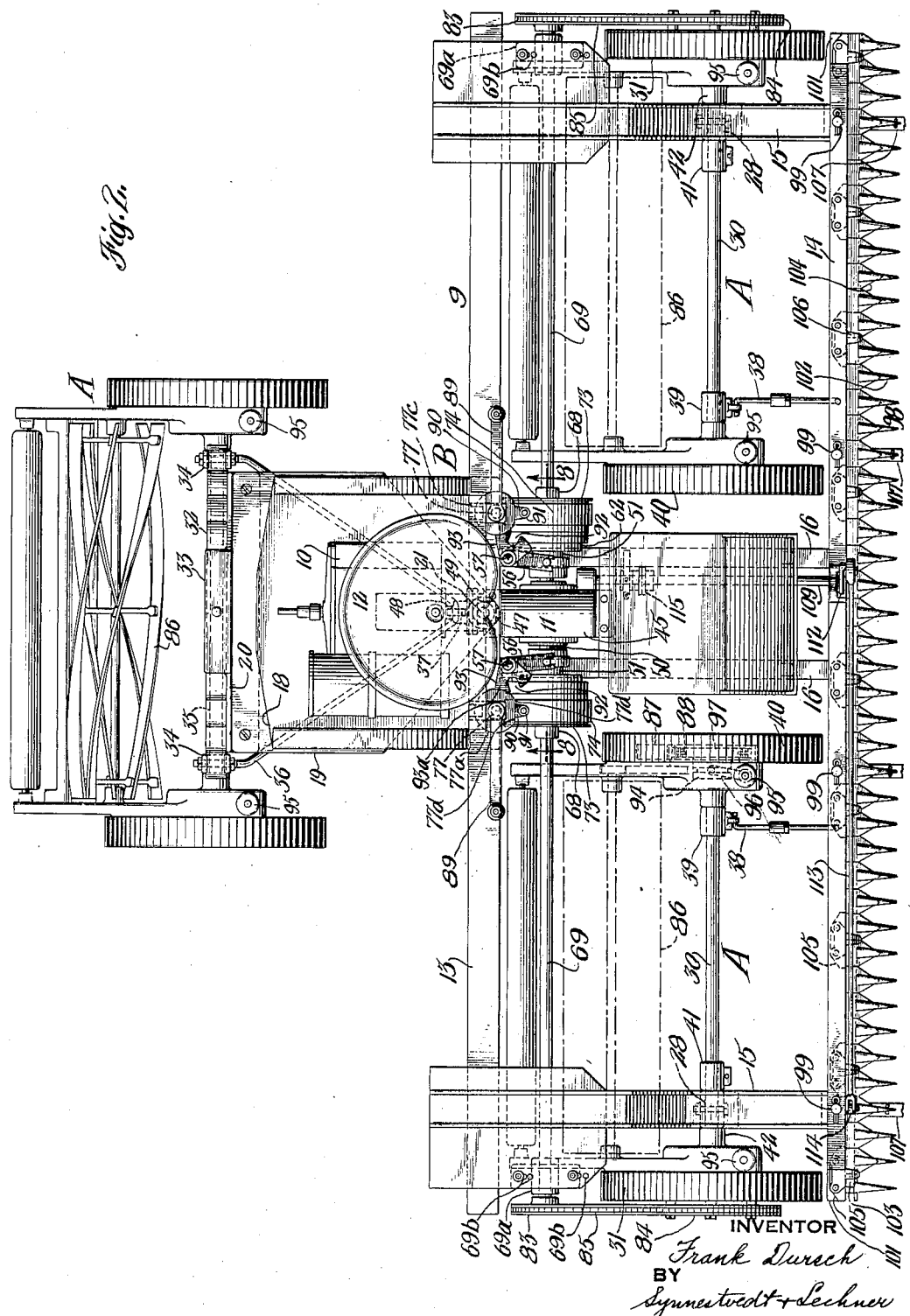

April 18, 1939. F. DURSCH 2,155,182
GANG LAWN MOWER
Filed Jan. 27, 1937 4 Sheets-Sheet 3
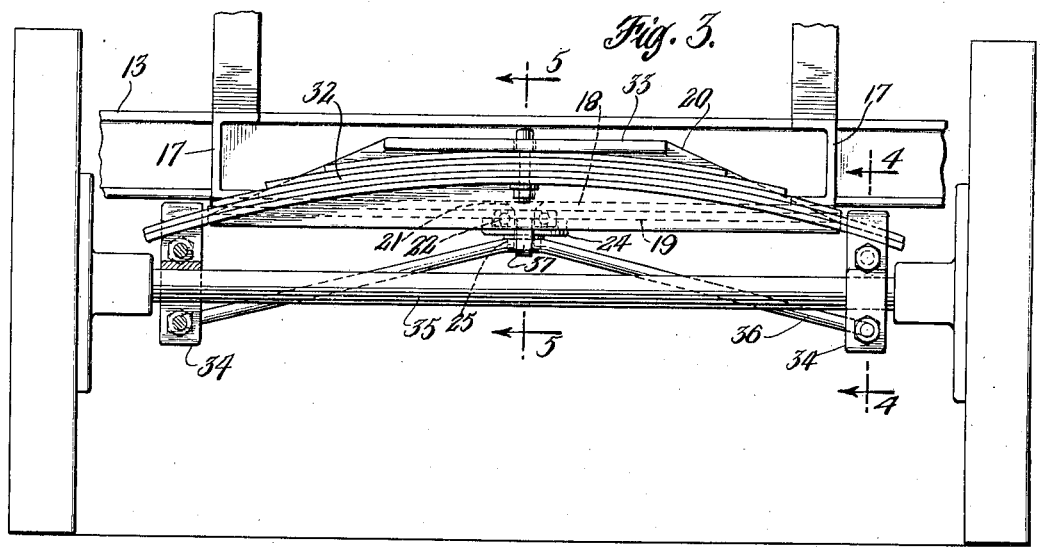
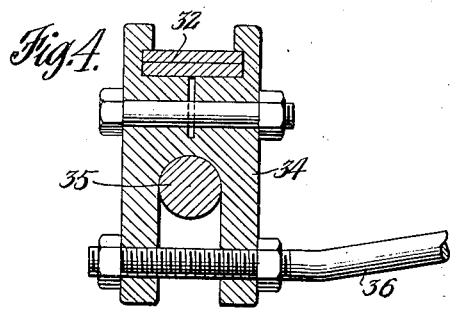
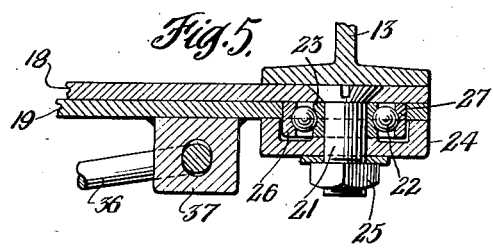
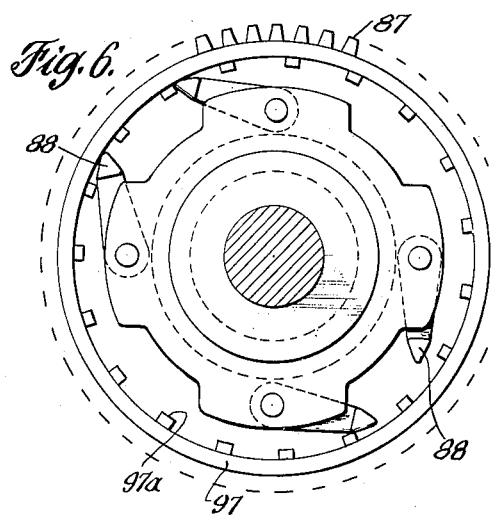
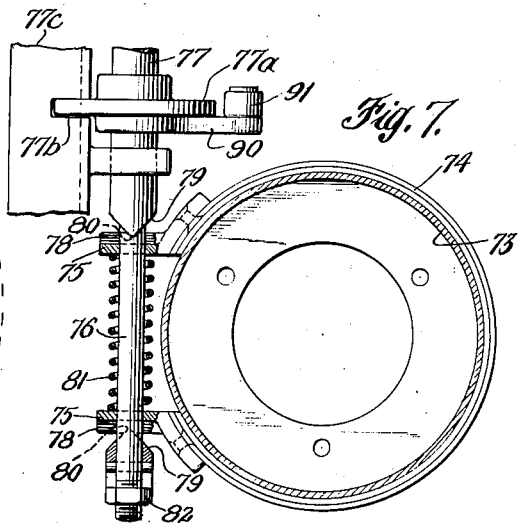
INVENTOR
Frank Dursch
BY
Synnestvedt & Lechner
ATTORNEYS

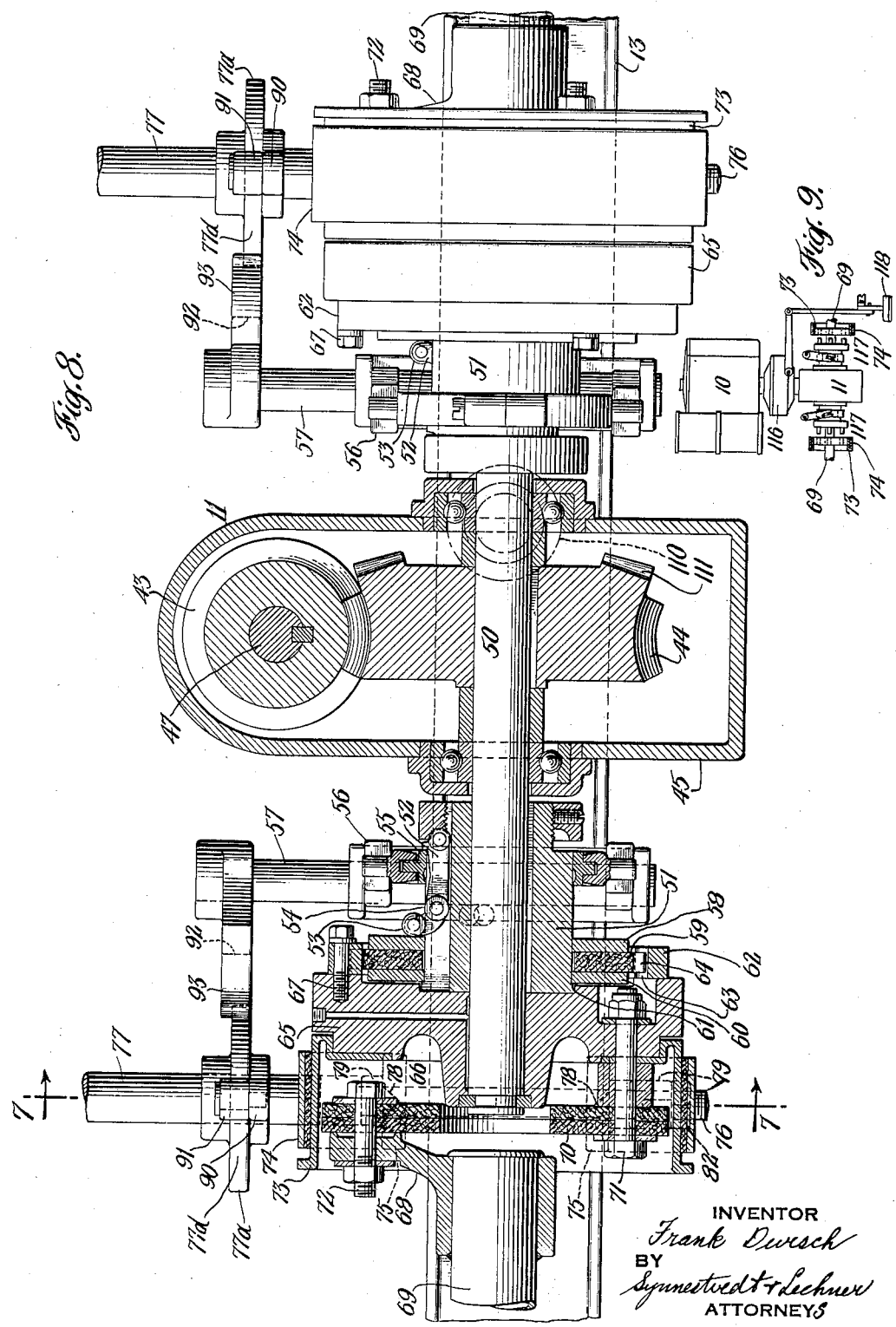

Patented Apr. 18, 1939

2,155,182

UNITED STATES PATENT OFFICE 2,155,182

GANG LAWN MOWER

Frank Dursch, Philadelphia, Pa.

Application January 27, 1937, Serial No. 122,535

8 Claims. (Cl. 56—7)

This invention relates to power driven gang lawn mowers and has for its primary object the provision of such a mower which is of simple construction, inexpensive to manufacture, adapted to be easily handled and maneuvered, and in which very effective traction is obtained.

Another object of my invention resides in the provision of a power gang lawn mower having a chassis with complete power plant supported on driving mower units of the gang, thereby dispensing with what is in effect the separate tractor or propelling unit heretofore employed in this art.

A further object of my invention is the provision of a power gang lawn mower having such a chassis in which the mower units have flexible connection with the chassis and may be readily detached from the chassis.

It is also an object of my invention to provide such a chassis with which mower units of well known and standard construction may be readily associated.

Other objects reside in the novel manner of applying power to the mower units of a gang lawn mower, in drive connections, and in control mechanism as will appear hereinafter.

Other objects and advantages of my invention will be set forth hereinafter as they will be more readily understood in connection with the description of the invention.

While I have illustrated an arrangement employing three mower units arranged in two transverse rows with one unit in the rear row and two units in the front row, I also contemplate employing the principles of construction and modes of operation of my invention in other arrangements of the units and with a larger number thereof.

How the foregoing, together with such other objects and advantages as may hereinafter appear or are incident to my invention, are realized is illustrated in preferred form in the accompanying drawings, wherein—

Figure 2 is a plan view of Figure 1 on a slightly reduced scale;

Figure 3 is an enlarged fragmentary rear view of the machine;

Figure 4 is an enlarged fragmentary cross-section taken substantially on the line 4—4 of Figure 3;

Figure 5 is an enlarged fragmentary cross-section taken substantially on the line 5—5 of Figure 3;

Figure 6 is an elevational view of a ratchet device associated with the wheels of the mower units;

Figure 7 illustrates a brake device which I employ, the section being taken substantially on the line 7—7 of Figure 8 with certain parts appearing in elevation;

Figure 8 is an enlarged view illustrating drive mechanism which I employ, the left-hand portion of the view being taken substantially on the line 8—8 of Figure 2, and the right-hand portion appearing in elevation; and Figure 9 is a diagrammatic view illustrating a modified clutch and driving arrangement.

Figure 1:
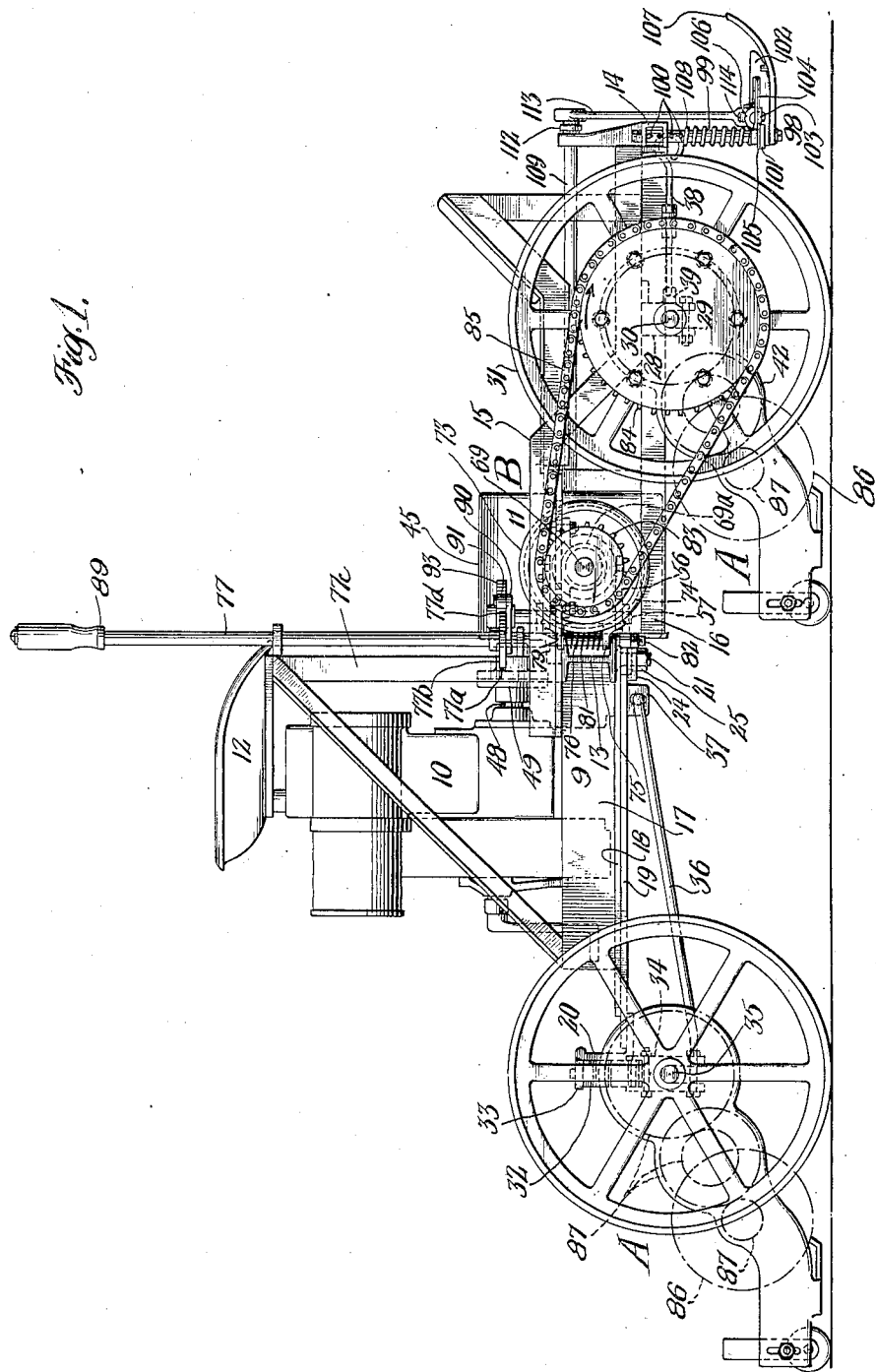
Figure 1 is a side elevation of a power gang lawn mower constructed in accordance with my invention.

My improved gang lawn mower comprises in general a plurality of mower units A, and a chassis B supported on the mower units. The chassis B comprises framework 9, a prime mover or engine 10, a clutch and driving unit indicated as a whole by the reference numeral 11, and a driver's seat 12.

The framework 9 in this instance is generally of I beam and channel iron construction and comprises a main front portion composed of longitudinal members 13 and 14, cross members 15, 16 and 17, and a plate 18 secured to the members 17 and 13; and a rear portion composed of a plate 19 and longitudinal member 20, which rear portion is pivotally connected to the main portion of the framework by means of a vertical pin 21 so that the framework is of articulated construction. Suitable supports are included in the framework for the driver's seat and for a foot platform, as clearly illustrated in Figures 1 and 2.

A ball bearing 22 is associated with the pin 21, as clearly shown in Figure 5, and the inner race 23 thereof is clamped between the fixed plate 18 and a collar 24 by means of the nut 25, while the outer race 26 has a force fit in the aperture 27 in the plate 19 of the rear frame portion.

In the particular arrangement of units illustrated, the chassis B is supported at the front on the mower units A of the front transverse row by means of bearing blocks 28 having slots 29 for receiving the axles 30 of the mower units. These bearing blocks 28 are secured to the underside of the end cross frame members 15 and bear on the axles at points adjacent the outer ground wheels 31. The chassis is supported at the rear on the mower unit of the rear row by means of a semi-elliptical spring 32, on the central portion of which, the flange 33 of the frame member 20 bears. The outer end portions of this spring are clamped in the bearing blocks 34 which straddle the axle 35 of the rear unit, as clearly illustrated in Figures 3 and 4. It is to be noted that the bearing blocks 34 are free to slide along the axle under influence of spring action. This spring arrangement in addition to providing a cushioning effect also enables the rear unit to tilt vertically with respect to the frame to take care of uneven ground conditions and thus provides flexibility. A radius rod or brace 36 connected from a lug 37 on the plate 19 to the lower portion of the blocks 34 is provided for bracing purposes.

It is to be observed that very firm support is provided between the main front portion of the framework and the pivoted rear portion by means of the plates 18 and 19.

It will be seen from the foregoing that the chassis has three point support on the mower units, namely, two points of front support at points adjacent the outer ground wheels of the front mower units and one point on the spring 32 of the rear unit. Since the only support on the front mower units is at the bearing blocks 28, these units are also free to tilt vertically with respect to the chassis, and this flexibility enables these units to readily accommodate themselves to uneven ground conditions.

In order to maintain the front units in alignment and substantially parallel with the chassis, I provide adjustable tie rods 38 which are pivotally attached at one end to the longitudinal frame member 14 and at their other ends to collars 39 secured on the axles of the front mower units at points adjacent the inner ground wheels 40 of the units. Since the tie rods are pivotally attached to the member 14 and collars 39, the connections are flexible to permit the units to tilt freely. The front mower units are held against displacement in longitudinal directions by means of collars 41 secured on the axles 30 to butt against the inner faces of the bearing blocks 28. In positioning these collars the gear housings 42 of the outer wheels are first brought up against the outer faces of the bearing blocks and then the collars are secured in place against the inner faces of the bearing blocks.

Referring now to one form of power mechanism, the clutch and driving unit 11, illustrated in detail in Figure 8, comprises in general any suitable form of reduction gearing, a pair of clutch devices, and coupling and brake means associated with the clutch devices. In this instance the reduction gearing comprises a worm 43 and a worm wheel 44 located within a housing 45, the worm 43 being keyed on a shaft 47 which is connected to the engine shaft 48 as by means of a coupling 49, and the worm wheel 44 being keyed on a longitudinally extending shaft 50. The particular clutches illustrated in Figure 8 are of standard form and each comprise a body member 51 keyed on the shaft 50 having a plurality of grooves for receiving pivoted arms 52 having clutch rollers 53 at their free ends and intermediate rollers 54 adapted to be engaged by a clutch collar 55 which is axially movable by means of a forked shifting device 56 carried by a rock shaft 57.

In the drawings the clutches are shown disengaged and in order to engage a clutch its clutch collar 55 is shifted axially by control from the driver's seat to engage the rollers 54, thus pressing the arms 52 inwardly and causing the clutch rollers 53 to press against the clutch disc 58 and clamp the externally toothed disc 59 of fibre or similar material between it and the clutch disc 60 which is pressed against a shoulder 61 on the clutch body. A driving ring 62 having internal teeth 63 engaging the external teeth 64 of the disc 59 is secured to the member 65 of a coupling 66 as by means of bolts 67 so that drive is transmitted from the engine to the coupling member 65.

The coupling 66 comprises the coupling member 65 just referred to, a coupling member 68 securely fastened on a longitudinally extending shaft 69, and flexible coupling discs 70 which are secured to the coupling member 65 by bolts 71 and to the coupling member 68 by bolts 72.

A brake is associated with each clutch unit and in this instance comprises a brake drum 73 carried by the coupling member 65 and a brake band 74 operable by control from the driver's seat.

By referring particularly to Figure 7 it will be seen that the brake band is provided with a pair of ears 75 having holes through which the reduced portion 76 of the brake operating rod 77 passes. The ears 75 are provided with V-grooves 78 adapted to cooperate with V-shaped members 79 carried by the rod 77 to release the brake. The operating rods 77 are positioned vertically by means of discs 77a which fit slots 77b in the upright frame member 77c. As illustrated in Figure 7, the brake is shown applied in which case the V-shaped members 79 are disposed at right angles to the V-grooves 78 so that the points of the members ride on the ears to press them toward each other and cause the brake band to grip the drum and apply the brake. In order to releasably hold the brake in applied position I have provided notches 80 in the ears extending at right angles to the V-grooves to receive the points of the V-shaped members 79. The brake may be released by rotating the brake operating rod 77 until the V-members 79 seat in the V-grooves 78 which causes the brake band to expand under influence of a spring 81. Brake adjustment may be made by the nut 82.

Referring now to the method of transmitting power from the power mechanism to the mower units I prefer to connect the driven shafts 69, 69 to the outer ground wheels 31, 31 of the front mower units as by means of a chain and sprocket drive comprising sprockets 83 secured at the ends of the shafts 69, sprockets 84 secured to the outer ground wheels 31 as by means of bolts securing them to the spokes of the wheels, and drive chains 85. The bearings 69a for the shafts 69 are adjustable as indicated at 69b whereby slack in the chains may be taken up. The tie rods 38 may also be adjusted in taking up slack in the chains.

The mowers are provided with any well known form of gearing between the wheels and the rotary cutters 86 as indicated at 87 in Figures 1 and 2, and ratchet devices of well known type are provided in the wheels, one type thereof being shown in Figure 6, it being noted, however, that in this figure two of the pawls 88 are shown reversed which is a special arrangement I employ in the two inner wheels 40 of the front units for a purpose hereinafter appearing. In the outer wheels 31 and in the wheels of the rear mower unit I employ the standard pawl arrangement which is to have all the pawls face in one direction to enable the cutter to be rotated from the wheel but also enabling the cutter to rotate without having it rotate the wheel.

By reversing certain pawls of the ratchet devices of the inner wheels these devices are locked, i. e., they become ineffective for ratcheting purposes and the gearing of these wheels will transmit drive either from wheel to cutter or from cutter to wheel. Through this arrangement I am enabled to transmit power from the outer wheel to the cutter and from the cutter to the inner wheel so that both wheels are power driven whereby I obtain the combined tractive effect of both wheels as well as power drive of the cutter. Thus, if both clutches are engaged and both brakes released, forward drive is obtained with all four wheels of the front units acting as drivers and with both cutters being power driven. Additional traction may be obtained by substituting double wheels for the single outer wheels of the driving mower units.

In order to obtain such forward drive, the operator swings both operating arms 89 forwardly with the result that the operating rods 77 are rotated to cause the V-portions 79 thereof to seat in the V-grooves 76 of the brake band ears 75. This causes the brake bands 74 to expand under influence of springs 81 to release the brakes. At the same time the levers 90 swing inwardly and their rollers 91 enter slots 92 provided in the plates 93 secured on the clutch operating rock shafts 57 and then cause the plates, the rock shafts, and the forked shifting devices 56 to rock in the direction of moving the clutch collars 55 to engage the clutches. This effects drive from the engine and gear transmission to the shafts 69, to the chain drives, to the outer wheels, to the cutters, and from the cutters to the inner wheels so that the mower moves straight forward with the rear unit trailing with its cutter revolving in the usual manner of lawn mowers. If it is desired to stop the mower, both operating arms 89 are pulled backwardly to the positions shown in Figure 2 to release the clutches and apply the brakes.

Assuming now that the machine is in straight forward progress as above described and it is desired to turn to the right, then the operator allows the left-hand operating arm to remain in its driving position but pulls the right-hand operating arm to the position shown in Figure 2 to release the clutch and apply the brake. This stops the outer right-hand wheel of the front right-hand mower unit and, since both wheels of the left-hand unit are still being power driven, the machine turns to the right on the outer right-hand wheel of the right-hand unit as a pivot. In thus turning, the left-hand or inner wheel of the right-hand unit is rotated from the ground and, since certain pawls of the ratchet device of this wheel have been reversed, the cutter is rotated by this wheel, with ratcheting taking place at the outer wheel because of the standard pawl arrangement in the outer wheel. Turning to the left is accomplished in a similar manner, i. e., the left-hand clutch is released and its brake applied while the right-hand clutch is engaged with its brake released.

It will be seen from the foregoing that the mower is very easily maneuvered by simple control from the driver's seat, it being only necessary to move both operating arms to driving position to travel straight ahead, to move the operating arm at the side toward which a turn is to be made to brake applying position to travel on a curve, and to move both arms to brake applying position when it is desired to stop. The amount of turning is determined by the length of time the operating arm which has been moved to brake applying position is so held, so that any amount of turning may be accomplished up to a complete circle with one wheel as the turning point. Thus reverse turns and right angle turns may be made without taking large sweeping turns.

As will be seen from Figure 2, the clutches cannot be engaged when the brakes are applied because the plates 93 have concave portions 93a which ride on the peripheries of the discs 77a and prevent rotation of plates 93 until the discs 77a have been rotated by the operating handles 89 to bring the cut-away portions 77d thereof around to register with the concave portions of the plates 93.

If it is desired to run the mower from place to place without having the cutters rotate, the cutters may be thrown out of driven connection with the wheels by means of any well known form of clutch device, such as indicated at 94 in Figure 2 in which the operating wheel 95 when turned rocks the arm 96 to move the gear 97 in an axial direction an amount to have the internal ratchet teeth 97a (see Figure 6) move out of the path of the pawls.

Extending across the front of the machine is a reciprocating cutter device 98 generally known in this art as a sickle bar. This device is supported from the longitudinal member 14 of the framework as by means of a plurality of upwardly extending arms or rods 99 having a plurality of vertically spaced pin receiving holes 100 by means of which vertical adjustment of the sickle bar may be made.

This device comprises in general a flexible guard bar 101 carrying a multiplicity of guards 102, a flexible knife bar 103 to which a multiplicity of triangular shaped knives 104 are secured, a plurality of wearing plates 105 for the knife bar, a plurality of knife clips 106, and a plurality of upwardly curved shoes 107. These shoes are so positioned that they will ride over irregularities or obstacles and cause the sickle bar to flex or yield due to its flexible construction, thus preventing damage to the sickle bar. Although the sickle bar is of flexible construction to enable it to yield to irregularities of ground surface or to obstacles, this does not interfere with the effectiveness of cutting because the cutter is made up of a multiplicity of relatively narrow knives and guards which enables the guard bar and knife bar to flex without interfering with cutting action. I prefer to construct the guard and knife bars of spring steel, although I have found that this flexibility may also be had by making them, for example, of cold rolled steel of light construction. I also contemplate employing cushioning springs 108 in the device as illustrated in Figure 1.

The reciprocating cutter device or sickle bar 98 is power driven from a drive shaft 109 having connection with the engine 10 as by means of bevel pinion 110 diagrammatically illustrated in Figure 8 and a bevel gear 111 carried by the worm wheel 44 of the gear transmission above described. This drive shaft is connected to the sickle bar by means of a crank 112 secured to the end of the drive shaft and a connecting rod 113 having connection with the crank at one end and with the reciprocating knife bar 103 at its other end, as indicated at 114. The sickle bar may be thrown into and out of operation as by means of a clutch 115 associated with the drive shaft 109.

No specific claim is made herein to the above reciprocating cutter mechanism per se since claims directed thereto have been made the basis of my copending application, Serial No. 127,344, filed February 24, 1937.

In Figure 9 I have diagrammatically illustrated a modified drive arrangement in which I employ a main clutch 116, which may be of the friction type, between the engine 10 and the gearing 11, and a pair of dog clutches 117, 117 for the shafts 69. In preferred arrangement I provide a foot pedal 118 for operating the clutch 116. The clutches 117 have brakes associated therewith and may be provided with controls such as described above.

While I have described the mower units B as being of the type employing a pair of end ground wheels, it is to be understood that advantages of the invention may also be obtained when employing mower units of the roller type in which case power may be applied to the rollers in the manner above described for the ground wheels.

It is also pointed out that since my chassis includes a complete power plant and since the mower units are readily detachable, I am enabled to obtain advantages of my invention for power lawn rolling purposes by substituting rollers for the mower units.

I claim:

1. A chassis for use with a plurality of conventional wheel supported rotary reel type mower units, the cutter reels of said units being adapted to be rotated by the wheels, said chassis being supported solely by said mower units and comprising framework, a prime mover supported by the framework, and transmission and clutch means for drivingly connecting and disconnecting said prime mover with the outer wheels of a pair of said mower units which are arranged in spaced transversely aligned relation whereby drive may be transmitted to both of said outer wheels for straight forward propulsion and to either one of said outer wheels for turning movement.

2. A chassis for use with a plurality of conventional wheel supported rotary reel type mower units, two of which are arranged in transversely aligned spaced relation, the cutter reels of said units being adapted to be rotated by the wheels, said chassis being supported solely by the mower units and comprising framework, connections between said framework and the mower units enabling independent tilting of the units with respect to the chassis, a prime mover supported by the framework, transmission and clutch means for drivingly connecting and disconnecting said prime mover with the outer wheels of said aligned mower units, and means for engaging and disengaging said clutch means.

3. A chassis for use with a plurality of conventional wheel supported rotary reel type mower units, two of which are arranged in transversely aligned spaced relation, the cutter reels of said units being adapted to be rotated by the wheels, said chassis being supported solely by the mower units and comprising framework, a prime mover supported by the framework, a driving connection from said prime mover to the outer wheel of one of said aligned mower units, and a driving connection from said prime mover to the outer wheel of the other of said aligned mower units, said driving connections each including a shaft, a clutch between the prime mover and shaft, a sprocket secured to said shaft, a sprocket secured to said outer wheel, and a drive chain connecting said sprockets.

4. A chassis for use with a plurality of conventional wheel supported rotary reel type mower units, two of which are arranged in transversely aligned spaced relation, the cutter reels of said units being adapted to be rotated by the wheels, said chassis being supported solely by the mower units and comprising framework, a prime mover supported by the framework, a driving connection from said prime mover to one of said aligned mower units for effecting propulsion through the medium of the wheels thereof, a driving connection from said prime mover to the other of said aligned mower units for effecting propulsion through the medium of the wheels thereof, and clutch means controlling said driving connections.

5. A chassis for use with a plurality of conventional wheel supported rotary reel type mower units, two of which are arranged in transversely aligned spaced relation and another of which is arranged to the rear and centrally of said transversely aligned units, the cutter reels of said units being adapted to be rotated by the wheels, said chassis being supported solely by said mower units and comprising framework having a forward portion flexibly supported by said transversely aligned mower units, and an articulated rearward portion flexibly supported by said rear mower unit, a prime mover supported by said framework, a driving connection from the prime mover to the outer wheel of one of said transversely aligned mower units, a driving connection from said prime mover to the outer wheel of the other of said transversely aligned mower units, and a clutch for controlling each of said driving connections.

6. A chassis for use with a plurality of conventional wheel supported rotary reel type mower units, two of which are arranged in transversely aligned spaced relation, the cutter reels of said units being adapted to be rotated by the wheels, said chassis being supported solely by the mower units and comprising framework, a prime mover supported by said framework having a power take-off shaft, a pair of power delivery shafts, a clutch between said power take-off shaft and each of said power delivery shafts, a brake for each of said power delivery shafts, a pair of control levers, connections between one of said levers and the clutch and brake of one delivery shaft for releasing said clutch and applying said brake and vice versa, connections between the other of said levers and the clutch and brake of the other delivery shaft for releasing said clutch and applying said brake and vice versa, chain and sprocket means drivingly connecting one of said delivery shafts to the outer wheel of one of said aligned mower units and chain and sprocket means drivingly connecting the other delivery shaft to the outer wheel of the other of said aligned mower units.

7. A chassis for use with a plurality of conventional wheel supported rotary reel type mower units, two of which are arranged in transversely aligned spaced relation, the cutter reels of said units being adapted to be rotated by the wheels, said chassis being supported solely by the mower units and comprising framework, a prime mover supported by said framework, a gear reduction device connected to the prime mover and having a power take-off shaft extending in a direction transversely of said chassis, a pair of driven shafts in substantial alignment with said power take-off shaft, a clutch for connecting and disconnecting one end of the power take-off shaft with one of said driven shafts, a clutch for connecting and disconnecting the other end of the power take-off shaft with the other of said driven shafts, a flexible coupling interposed between each of said clutches and driven shafts, means for independently controlling said clutches, chain and sprocket means for drivingly connecting one of said driven shafts to the outer wheel of one of said aligned mower units, and chain and sprocket means for drivingly connecting the other of said driven shafts to the outer wheel of the other of said aligned mower units.

8. A chassis for use with a plurality of conventional wheel supported rotary reel type mower units, two of which are arranged in transversely aligned spaced relation in a front row and another of which is arranged to the rear and centrally of said two aligned units, the cutter reels of said units being adapted to be rotated by the wheels of the units, said chassis comprising framework having a forward portion and an articulated rearward portion, yoked bearings carried by the forward portion of said framework and engaging the front mower units adjacent their outer wheels for support, links connected at one end to the front mower units adjacent their inner wheels and at their other ends to the forward portion of said framework, a leaf spring secured at its middle portion to said rearward articulated portion of the frame and having its free end portions in engagement with the rear mower unit adjacent its wheels for support, a prime mover carried by said framework, and transmission and clutch means for effecting the transmission of power from the prime mover to either of said front mower units for turning movement and to both of said mower units for forward propulsion.

FRANK DURSCH.